United States Patent [19]

Kwang-Chien

[11] Patent Number: 4,880,967
[45] Date of Patent: Nov. 14, 1989

[54] COORDINATE VECTOR METHOD FOR OPTICAL INPUT DEVICE

[76] Inventor: Fong Kwang-Chien, 3F-2 No. 3, Alley 6, Lane 118, Sec. 1, Chung Yang Road, Tu Cheng Hsiang, Taipei, Hsien, Taiwan

[21] Appl. No.: 344,522

[22] Filed: Apr. 25, 1989

Related U.S. Application Data

[63] Continuation of Ser. No. 67,534, Jun. 29, 1987, abandoned.

[51] Int. Cl.⁴ .............................................. G01V 9/04
[52] U.S. Cl. ..................................... 250/221; 340/710
[58] Field of Search ................... 250/221, 229, 231 R, 250/237 R, 237 G; 74/471 XY; 382/59, 65; 364/190; 340/706–710, 870.29

[56] References Cited

U.S. PATENT DOCUMENTS

| 4,260,979 | 4/1981 | Smith | 382/59 |
| 4,390,873 | 7/1983 | Kirsch | 340/710 |
| 4,409,479 | 10/1983 | Sprague et al. | 340/710 |
| 4,521,772 | 6/1985 | Lyon | 340/710 |
| 4,543,571 | 9/1985 | Bilbrey et al. | 250/231 R |
| 4,647,771 | 3/1987 | Kato | 250/221 |
| 4,686,329 | 8/1987 | Joyce | 250/237 R |
| 4,712,100 | 12/1987 | Tsunekuni et al. | 250/237 G |

Primary Examiner—David C. Nelms
Attorney, Agent, or Firm—Lowe, Price, LeBlanc, Becker & Shur

[57] ABSTRACT

An optical input device based on a coordinate vector method in the illumination of a coordinate plane by a light source to generate a grid-shaped projection identical to the grid drawn on the coordinate plane is described. The projection is magnified and then transmitted to a light sensitive group of units which measure the brightness or darkness of the projection and generate an electrical signal based thereon which is furnished to a central processing unit. The central processing unit then evaluates the change in the signals transmitted to determine displacement and distance the light source is moved on the coordinate plane and to input into a computer for further control of the displacement of the computer cursor or similar device.

3 Claims, 4 Drawing Sheets 0 0 1
0 0 1
1 1 1

0 1 1
0 1 1
1 1 1

0 1 0
0 1 0
1 1 1

1 0 1
1 0 1
1 1 1

COORDINATE VECTOR METHOD FOR OPTICAL INPUT DEVICE

This application is a continuation of Application Ser. No. 067,534, filed June 29, 1987, now abandoned.

BACKGROUND OF THE INVENTION

This invention is related to a kind of coordinate vector method for optical input device especially referring to its light sensitive units arranged in matrix shape capable to receive the image variation generated by the light source moving on coordinate plane. Its electronic signal will via a central processing unit control the movement of a computer cursor or the like.

SUMMARY OF THE INVENTION

The invention is to furnish a kind of coordinate vector method for optical input device composing of light source, coordinate plane, magnifying lens, reflector and central processing unit (C.P.U.). This device mainly uses the bright & dark image variation generated by the reflection of the light source moving on the coordinate plane. After magnifying, it projects on light sensitive units arranged in matrix type and makes the light sensitive units generate corresponding electronic signals which are sent into a central processing unit. In coordination with the design of software, it will construct therefore input device for controlling the movement of a cursor in both direction and distance.

BRIEF DESCRIPTION OF THE DRAWING

FIGS. 4-1, 4-2, 4-3 and 4-4 are the flow chart of the motion of the invention.

DESCRIPTION OF THE PREFERRED EMBODIMENTS

Figure 1:
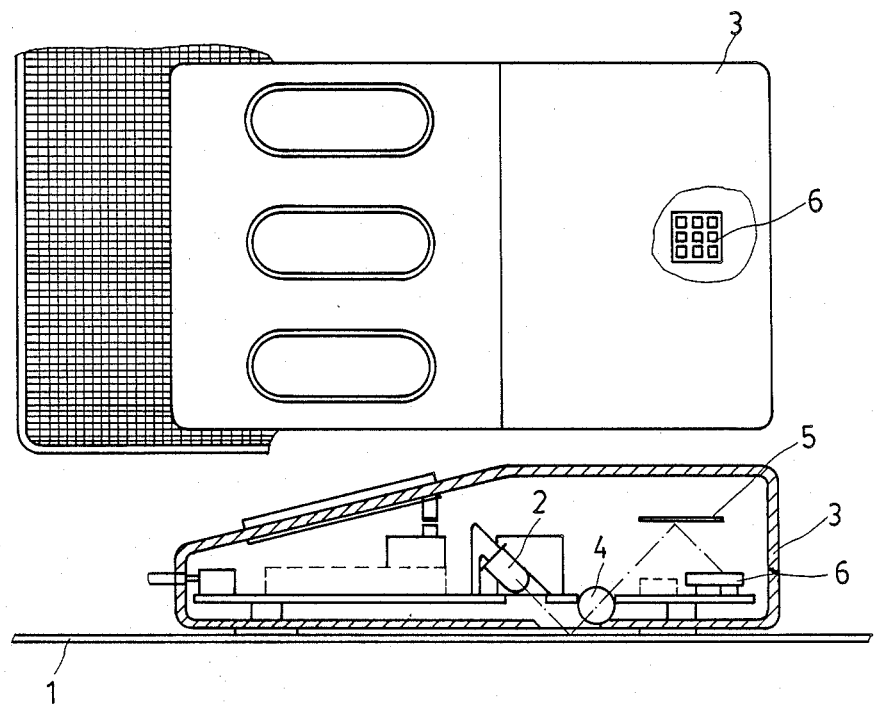
FIG. 1 illustrates the utilization of the invention.

FIG. 1 illustrates the utilization of the invention. On the coordinate plate (1), coordinate cells are drawn of equal size with pitch lines in same width. The light source (2) can be any visible or invisible light installed in the interior of a shell (3). Carried by the shell (3), it can move on the coordinate plane (1) in any direction and distance. The beam generated by the light source projects on coordinate plane for generation of grid-shaped reflecting projection in the same size and shape as coordinate cells. In this preferred embodiment, the pitch lines of the coordinate cells are light absorbing and the reflecting projection of this portion is dark while the four cells in the middle have bright reflecting projections. Those grid-shaped reflecting projection are magnified by optically magnifying transmitters such as magnifying lens (4), reflector (5) etc. and finally project on the light sensitive units (6).

The light sensitive units can be constructed from light sensitive elements such as light sensitive diodes, photo cells, CDS etc. arranged in a matrix. In this preferred embodiment, the nine light sensitive units are arranged in the matrix of 3×3. Certainly if necessary, matrix of 4×4 or other combinations can also be adopted. There are two kinds of the arrangement of light sensitive units.

Figure 2:
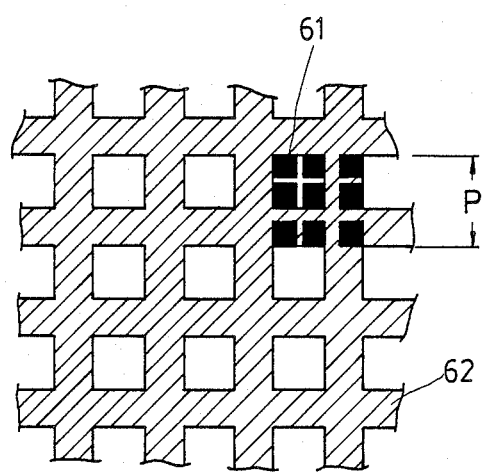
FIG. 2 illustrates the light sensitive units intensively arranged.

The FIG. 2 illustrates the intensive arrangement of light sensitive units of the invention in which each black block(61) represents a light sensitive unit and the slant cell (i.e. reflecting projection (62)) in segment is the grid-shaped reflecting projection after magnifying. In such way of arrangement, the length of each side of the light sensitive units equals to a unit pitch (P) so that the area of the light sensitive units can be reduced even so that all of the light sensitive units are in a chip and each light sensitive unit is partitioned from the others.

Figure 3:
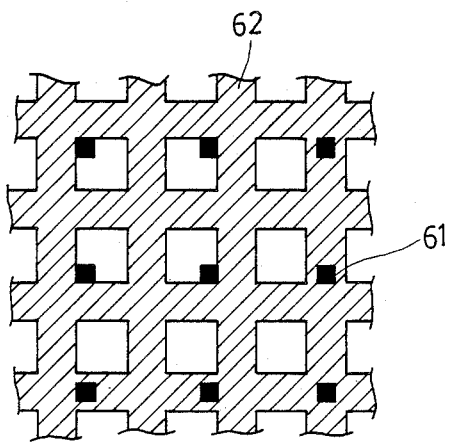
FIG. 3 illustrates the light sensitive units divergently arranged.

FIG. 3 illustrates the divergent arrangement of light sensitive unit of the invention. As the size and ratio of the grid-shaped reflecting projection (62) are fixed, the same effect can be reached if light sensitive units are arranged in different positions as shown.

Figures 1, 4:
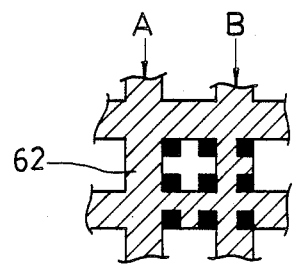
Figures 2, 4:
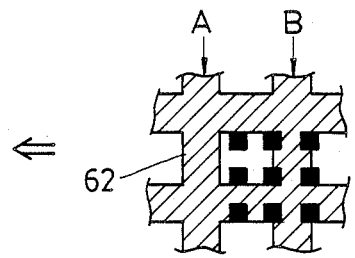
Figures 3, 4:
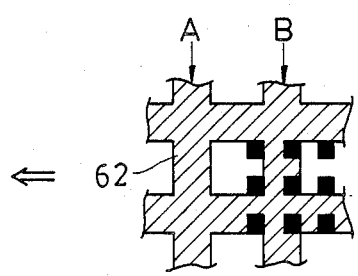
Figure 4:
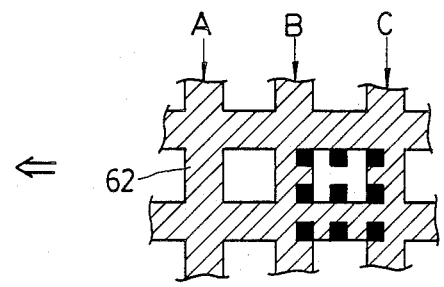

FIGS. 4-1 to 4-4 is the motion flow chart of the invention in which when the light source (2) moves to the left on the coordinate plane for a coordinate square, FIG. 4-1 denotes the relative positions of grid-shaped reflecting projection (62) and the light sensitive units before the moving the light source. For facilitating description, the rspective vertical & oblique projections are marked by the recognition codes of A.B.C. in the figures under each corresponding drawing. It is also noted with the electronic signal generated by each light sensitive unit. "0" denotes low-level and "1" denotes high level. In FIG. 4-2, the grid-shaped reflecting projection (62) starts to move leftward and the light sensitive units located at the upper part of the central and in the middle are shielded by the dark image of "B". Consequently, their electronic signals are changed from "0" into "1".

In FIG. 4-3, grid-shaped projection continues to move further leftward and the light sensitive units at the upper prt of right side and the right side of the middle sense the bright projection. Consequently, their electronic signals are changed from "1" into "0".

In FIG. 4-4, the grid-shaped projection continues to move further leftward and only the light sensitive units at central upper part and in the middle receive the projection from the bright portion with electronic signal of "0". The electronic signal generated by other light sensitive units are all in "1".

Figure 5:
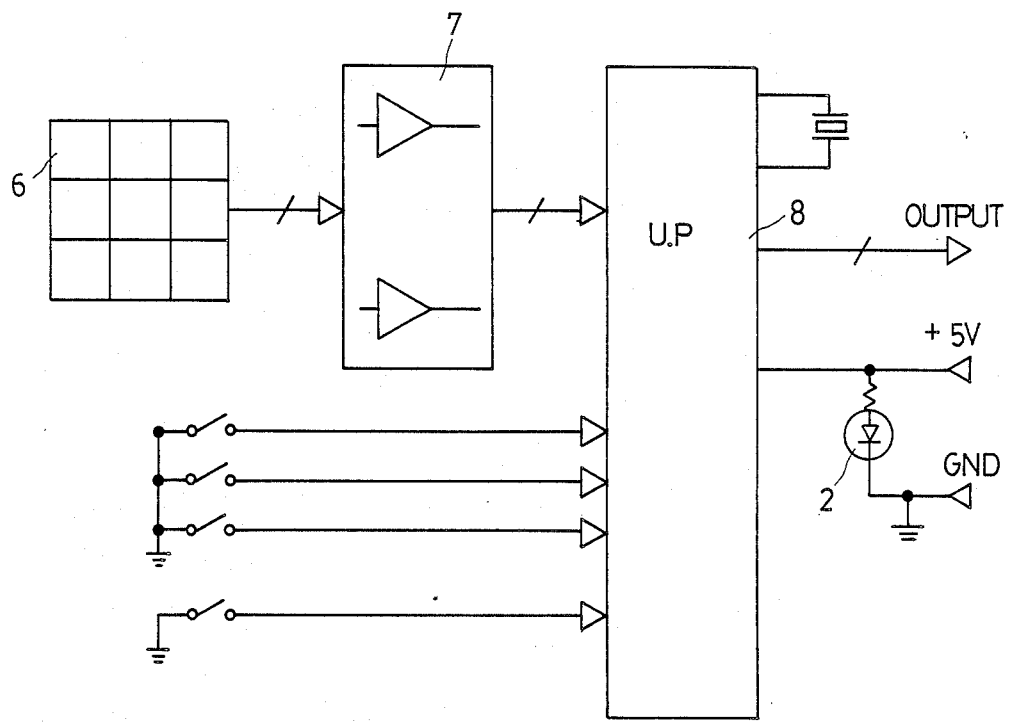
FIG. 5 is the circuit block diagram of the invention.

Thus, the variation of electronic signals "0" and "1" generated by respective light sensitive units after displacement, via signal amplifying circuit (7) as shown in FIG. 5, inputs into processor (8) for comparison with the signals before displacement for detection of the direction & distance of displacement or to compare with the table established in the central processing unit (C.P.U.) for calculation of the amount of displacement. The various vectors and amount of displacement will be sent, in the type of series communication interface (RS 232-C) or in other types, into the computer for getting displacement value and driving the cursor position. Assume the grid-shaped projection is magnified N times and the gap of light sensitive unit is S, then the minimum detected displacement will be $(P/N) \div S = P/NS$ in which the $(P/N)$ is the unit pitch of coordinate plane.

Figure 6:
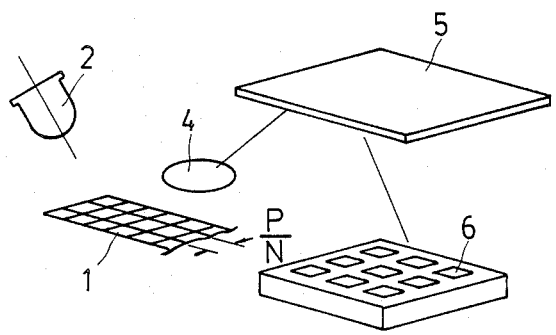
FIG. 6 is the perspective view of the invention.

FIG. 6 illustrates the perspective structure for reference.

I claim:

1. An optical input device for a cursor or the like based on the coordinate vector method comprising:
    a moveable light source, a coordinate plane having a grid thereon and a matrix of light sensitive units adapted to be coupled to a central processing unit said grid having a predetermined pitch of equal spacing both in the horizontal direction and perpendicular thereto each line in said grid having a predetermined width, said matrix having light sensitive units of a predetermined dimension horizontally and perpendicular thereto and a predetermined separation distance, the dimension and distance being related to the pitch and line width of the grid;

means for directing the light source onto the plane and for projecting a grid image;

magnifying means and reflecting means for magnifying the image and directing it onto the matrix, said grid being dimensioned relative to the matrix so that each light sensitive unit will emit either a high or a low signal depending on the intensity of the light striking it the relationship between the dimension and distance between light sensitive units and the pitch and line width of the grid in the image being such that all light sensitive units never emit either a high or a low signal at any position of said light source relative to said grid so that the signals emitted can be interpreted by a central processing to calculate distance and direction as the light source moves across said plane.

2. The device of claim 1 wherein the matrix is a matrix of $3 \times 3$ light sensitive units.

3. The device of claim 1 wherein the magnifying means magnifies the projection N times and the space between the light sensitive units in said matrix is S and the grid pitch is P then the minimum detected movement of the light source will be $(P/N) \div S = P/NS$ in which $(P/N)$ is the unit pitch of the coordinate plane.

* * * * *